United States Patent [19]

Metschl et al.

[11] Patent Number: 4,544,384
[45] Date of Patent: Oct. 1, 1985

[54] ADSORBER FOR TWO-COMPONENT RECOVERY AND METHOD OF OPERATING SAME

[75] Inventors: Michael Metschl, Munich; Hannsjörg Koch, Wolfratshausen; Wilhelm Rohde, Munich, all of Fed. Rep. of Germany

[73] Assignee: Linde Aktiengesellschaft, Wiesbaden, Fed. Rep. of Germany

[21] Appl. No.: 555,188

[22] Filed: Nov. 25, 1983

[30] Foreign Application Priority Data

Nov. 25, 1982 [DE] Fed. Rep. of Germany ....... 3243656

[51] Int. Cl.⁴ ............................................. B01D 53/06
[52] U.S. Cl. ........................................ 55/180; 55/179; 55/387; 55/390
[58] Field of Search ................... 55/31, 33, 35, 59, 62, 55/74, 75, 179, 180, 387, 389, 316

[56] References Cited

U.S. PATENT DOCUMENTS

| | | | |
|---|---|---|---|
| 2,080,578 | 5/1937 | Ray | 55/179 |
| 2,101,555 | 12/1937 | Moore et al. | 55/179 X |
| 2,379,321 | 6/1945 | Sutcliffe et al. | 55/180 |
| 2,430,861 | 11/1947 | Carpenter et al. | 55/316 X |
| 2,622,414 | 12/1952 | Jaubert | 55/179 X |
| 2,790,512 | 4/1957 | Dow | 55/35 |
| 3,204,388 | 9/1965 | Asker | 55/31 |
| 3,504,483 | 4/1970 | Tamura et al. | 55/180 |
| 3,738,084 | 6/1973 | Simonet et al. | 55/31 |
| 3,841,058 | 10/1974 | Templeman | 55/33 |
| 3,917,458 | 11/1975 | Polak | 55/316 X |
| 4,256,474 | 3/1981 | Berger, Jr. et al. | 55/316 X |

FOREIGN PATENT DOCUMENTS

| | | | |
|---|---|---|---|
| 2707226 | 2/1978 | Fed. Rep. of Germany | 55/59 |
| 712342 | 9/1931 | France | 55/59 |

*Primary Examiner*—Robert Spitzer
*Attorney, Agent, or Firm*—Karl F. Ross; Herbert Dubno

[57] ABSTRACT

An adsorber for the cleaning of air or natural gas by the removal of water as a first component and carbon dioxide and/or a hydrocarbon as a second component from the gas stream to be treated utilizes two distinct adsorber beds traversed in succession by the gas stream, at least one of these beds being vertically oriented so that the gas stream and the regenerating gas pass horizontally through it.

2 Claims, 6 Drawing Figures

ADSORBER FOR TWO-COMPONENT RECOVERY AND METHOD OF OPERATING SAME

FIELD OF THE INVENTION

Our present invention relates to an adsorber unit for two recoverable components, i.e. for the removal of two distinct components from a multicomponent gas stream, and to a method of operating such an adsorber. More particularly, the invention relates to an adsorber of the type in which two separated absorber beds are traversed in succession by a multicomponent gas stream for the componentwise removal of two distinct components from the gas stream which, in addition, can contain other components or substances. The invention is especially directed to an adsorber of this type which, upon regeneration, evolves one of the two adsorbed components in a liquid state and the other of these components in a gaseous state.

BACKGROUND OF THE INVENTION

In the adsorptive purification of the gases, the adsorptive separation of gases and in the adsorptive recovery selectively of components from gases, it is known to provide an adsorber having two separated beds which are traversed in succession by the multicomponent gas stream for the selected removal of the two different components therefrom.

Examples of the removal of two components from a gas mixture include the treatment of moist air prior to separation of the air into the low-boiling components so as to remove water and carbon dioxide, the treatment of natural gas to remove water and higher hydrocarbons and other systems which, upon regeneration of the adsorber beds, produce one of the components, e.g. water in a liquid form, while the other component is discharged from its adsorber bed in a gaseous form.

After adsorption operation for a period sufficient to result in the saturation of one of these beds, the adsorber is regenerated, usually by the treatment of the beds in succession with a regenerating or adsorption gas. It is during this regeneration that one of the components is evolved in a liquid state or phase while the other component is evolved in a gaseous state or phase.

For efficient operation of the adsorber, it is imperative that not only the gaseous desorbed component be discharged completely, but also that the liquid component be removed to the greatest possible extent.

To this end, in German Patent Document—Open Application DE-OS No. 27 46 673, a substantially horizontal adsorber bed is provided which is traversed by the gas to be treated in a vertical direction and which rests upon a gas-permeable grate through which the liquid component upon regeneration can trickle.

An adsorber having horizontal beds of this type is found to have large amounts of free space which cannot effectively be utilized and to require considerable area in a plant where floor space may be at a premium. Furthermore, these adsorbers do not operate fully effectively, frequently cannot assure complete discharge of the liquid phase produced during regeneration and, with respect to their size, are comparatively expensive to construct and maintain.

OBJECTS OF THE INVENTION

It is the principal object of the present invention to provide an adsorber for the selective removal of two components from a multicomponent gas stream in the manner described but which is free from disadvantages of earlier systems and, especially, for a given degree of operational reliability, has a reduced volume and occupies less space, or for a given volume has higher adsorptive capacity for greater efficiency.

Another object of this invention is to provide an improved method of operating a selective adsorber of the type described.

Another object of this invention is to provide an adsorber unit for the purposes described which can be fabricated at lower cost than earlier adsorbers of a similar capacity.

SUMMARY OF THE INVENTION

We have discovered that these objects can be attained and the operations of a two-component adsorber greatly improved over earlier systems when at least one of the two beds is an upright bed and is traversed horizontally by the fluids associated therewith, i.e. the gas to be treated and the regenerating gas.

According to the invention, therefore, an adsorber is provided which includes the usual adsorber shell or housing but which may be vertically elongated and is provided with two spaced-apart beds, successively traversed by the gases passing through this housing, the beds being designed to extract respective components from a multicomponent gas stream to be treated and, upon regeneration, to evolve one of these components in a liquid and another of these selectively adsorbed components in a gas phase, one of these beds at least being vertically oriented or upright and traversed by the gas streams in a substantially horizontal direction.

We have found, most surprisingly, that this arrangement, in which at least one of the beds is vertically oriented, can greatly reduce the free space or unused volume of the adsorber by comparison with an adsorber having only horizontal beds and operated with the same performance so that the overall volume of the adsorber can be markedly reduced. Conversely, for a given volume, the separating capacity or efficiency can be markedly increased.

According to the invention, the first adsorber bed is the adsorber bed which evolves its adsorbed components in a liquid state upon desorption while the second adsorber bed evolves its adsorbed component in a gaseous state, the first and second adsorber beds being traversed in this order or reverse order by the gas stream to be treated.

We have found it to be especially advantageous when at least the second adsorber bed, which upon regeneration evolves its component in a gaseous state, or in which its adsorbed component is trapped in a gaseous state, is the upright and vertically elongated bed.

In a preferred embodiment of the invention, the first adsorber bed is a horizontal or recumbent bed and is traversed by the gases in the vertical direction.

In another preferred embodiment of the invention, the first adsorber bed is also upright. The combination of two upright adsorber beds in a common housing has been found to be especially advantageous because of the small area occupied by the adsorber, the simplicity of the construction and the reduced volume of the apparatus.

It has also been found to be desirable to provide the second adsorber bed above the first adsorber bed, thereby simplifying the discharge of the component which is released in the liquid phase from the housing.

The second adsorber bed can have the configuration of an upright cylinder with a circular horizontal cross section and surrounding a vertical axis, the cylinder being hollow so that its cross section is annular. In this case, the interior or hollow of the cylinder can be provided with gas flow means, i.e. means for feeding gas to the cylindrical bed or recovering gas from this bed. This fitting can be connected to or formed in the housing wall.

The hollow cylindrical configuration of the bed has been found to be especially space-saving and permits simplification of the means for introducing the adsorbent, for controlling the height of the adsorbent bed and hence for adjusting the level of the adsorbent for various purposes. The gas mixture traverses the cylindrical body of an adsorbent in a horizontal direction. The second adsorber bed, in a variation of this them, can be subdivided into a plurality of spaced-apart vertically oriented sections which can be parallel to one another and to the axis or vertical wall of the housing and which can be internally provided with the means for feeding the gas to and discharging the gas from the adsorbent, while being connected to the housing wall. In this embodiment as well, each section of the second adsorber bed can be traversed horizontally by the gases and can be disposed within a respective compartment of the housing, the compartments of the housing being separated by partitions on one or more sides. The housing itself may be subdivided into compartments by the planar or arcuate vertically oriented sections of the second bed.

It has been found to be advantageous to provide a partition between adsorber beds, e.g. between the first and second adsorber beds, so that it has a frustoconical or wedge-shaped profile whose half apex angle corresponds to the maximum piling angle of the adsorbent thereabove so that it can allow adsorbent above this partition to slide downwardly. When the apparatus is also provided with an opening in the region of or aligned with the end of the partition, filling of the beds is simplified since the material for the lower bed can be introduced first and can pass the partition as a result of the fact that the angle of inclination of the partition does not impede the flow of the material thereabove. When the first bed is completely filled in this manner, the adsorbent of the second bed is introduced and stacks above the first bed.

It has been found to be advantageous to provide the first absorber bed with a drying gel and the second absorber bed with molecular sieve.

In the method of the invention, we provide that the gas stream to be treated and the regenerating gas stream pass through at least one of the two beds in a horizontal direction.

According to one embodiment of the method, the first adsorber bed is traversed vertically upwardly by the gas mixture although at another embodiment of the invention both beds are traversed in the horizontal direction by the gas mixture. Preferably, moreover, water is removed from the gas mixture in the first absorber bed while in the second adsorber bed carbon dioxide and/or a higher carbon then methane, e.g. ethane, is removed.

BRIEF DESCRIPTION OF THE DRAWING

The above and other objects, features and advantages of the present invention will become more readily apparent from the following description, reference being made to the accompanying drawing in which.

SPECIFIC DESCRIPTION AND EXAMPLE

Figure 2:
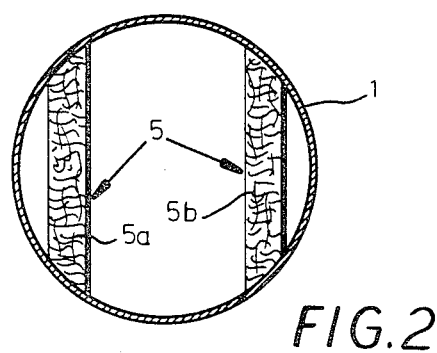
FIG. 2 is a horizontal cross section through the embodiment of FIG. 1.
Figure 1:
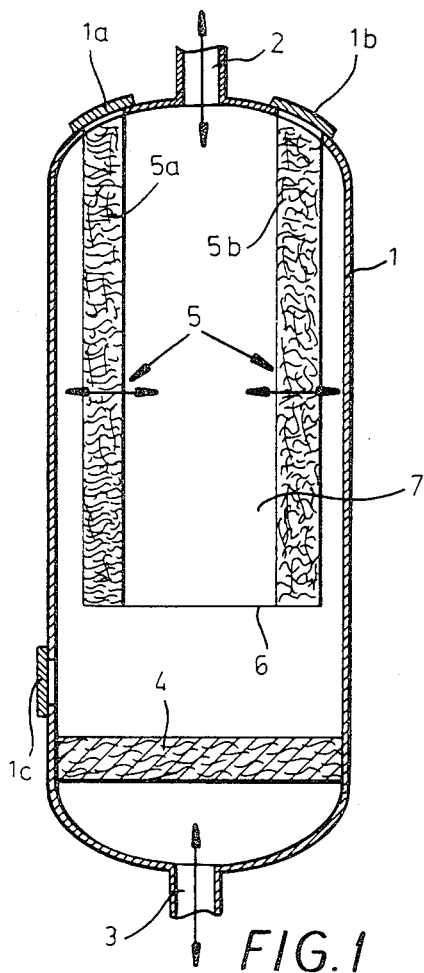
FIG. 1 is a diagrammatic vertical section illustrating a first embodiment of the invention.

As can be seen from FIGS. 1 and 2, an adsorber for the purposes of the present invention can comprise a cylindrical housing 1 which can be formed at its upper and lower ends with fittings 2 and 3 for passing the gas to be treated and the regenerating gas through the housing in the axial and vertical directions. These fittings 2 and 3 represent means for feeding gas to and discharging gas from the beds which are disposed within the housing and are axially aligned, i.e. are disposed along the axis of the housing 1.

The adsorber housing 1 is vertically elongated and upright and thus has a vertical axis.

In the lower portion of the housing 1, a first adsorber bed 4 is provided, this adsorber bed consisting, for example, of a drying gel capable of trapping water from moist air or natural gas which may be processed through the adsorber.

Figure 1A:
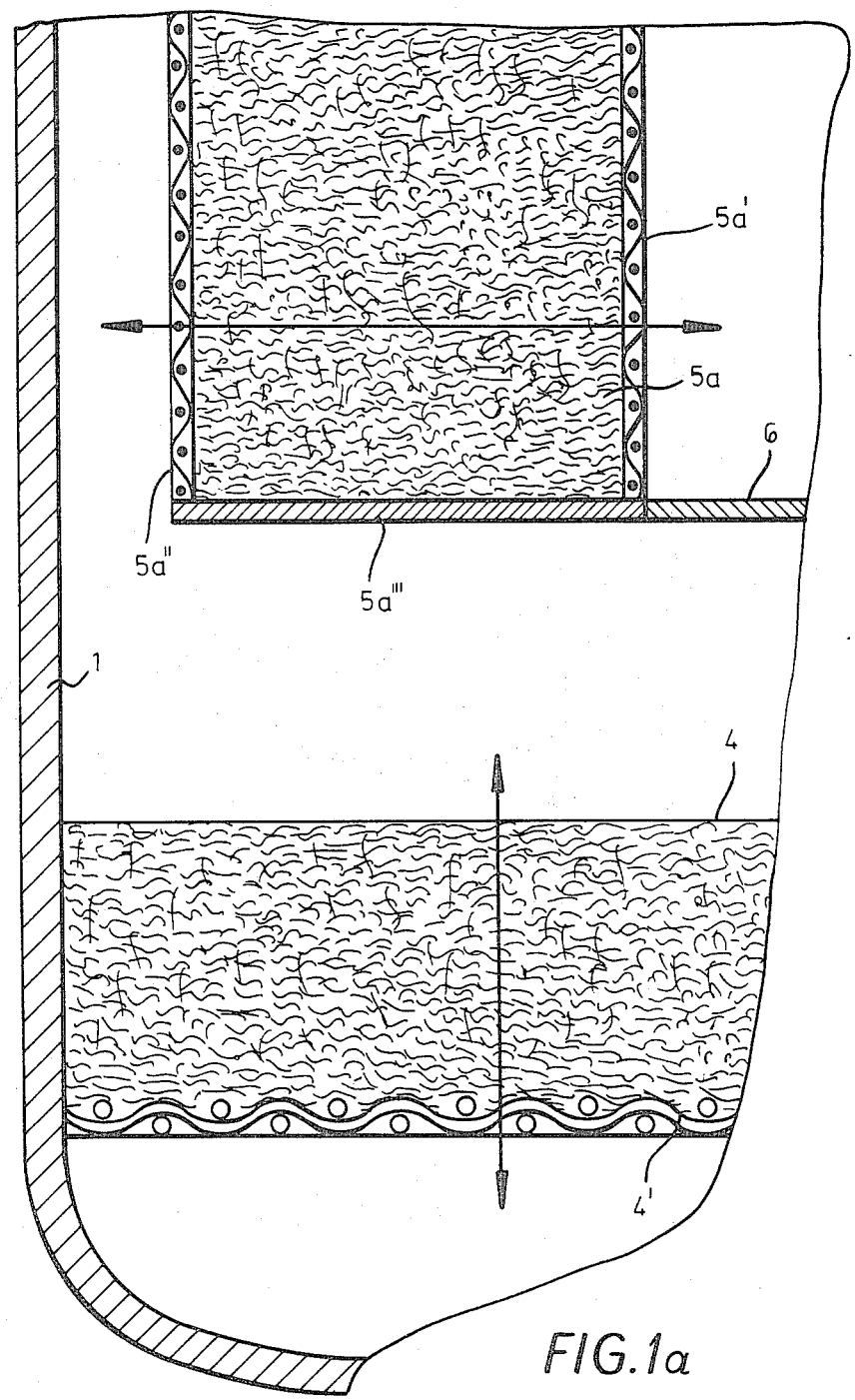
FIG. 1a is a detail view through this embodiment.

As can be seen from FIG. 1a, the first adsorber bed 4 rests upon a gas-permeable grate 4', is horizontal and extends over the full cross section of the housing 1.

Above the adsorber bed 4 within the housing 1, a second adsorber bed 5 is provided, this adsorber bed consisting of a second adsorbent, e.g. a molecular sieve dimensioned to retain carbon dioxide and and/or ethane from the gas to be treated.

In the embodiments of FIGS. 1 and 2, the second adsorber bed 5 is divided into the two partial beds or bed sections 5a and 5b which are planar, mutually parallel and disposed symmetrically on opposite sides of the housing axis, these beds being enclosed in gas-permeable walls which run to the top of the housing and are connected to the upper and lateral walls thereof as should be apparent from FIG. 2. At the bottom ends of these adjoining beds, a horizontal partition 6 interconnects the partial beds to define a space 7 above the partition 6 and between the two parallel beds.

The fitting 2 opens into this space.

As will be apparent from FIG. 1a, a pair of parallel walls 5a' and 5a'' vertically enclose the partial bed 5a and the latter is supported at the bottom by a gas impermeable wall 5a'''.

The operation of the adsorber unit of the invention will be described by way of example for the cleaning of air which may be subjected to low temperature air rectification, i.e. separation of nitrogen and oxygen for the Linde Process. The air is cleaned to eliminate moisture and carbon dioxide as well as hydrocarbons from the air before such air rectification.

The adsorbent for each of the sections 5a and 5b is introduced through hatches 1a and 1b while a hatch 1c is provided for the housing to permit replacement of the adsorbent of the bed 4. Once the beds are in place in a first operating step, air is passed through the adsorber from the opening 3 to the fitting 2 and is dried in vertically traversing the drying gel forming the bed 4. The moisture-free air then passes horizontally through the bed sections 5a and 5b of a second adsorbent bed 5 which is a molecular sieve and removes carbon dioxide and hydrocarbons. The cleaned air is discharged via the fitting 2.

When the adsorber is fully charged, i.e. one of the two beds is saturated or both are saturated, the second phase of the operating cycle is effected, i.e. the supply of air is cut off and a regenerating gas, e.g. nitrogen, is passed through the adsorber in the opposite direction.

The nitrogen entering through fitting 2, thus first traverses the second adsorber bed 5 substantially horizontally to entrain the gaseous products, e.g. the carbon dioxide and hydrocarbons adsorbed thereby. Then the nitrogen flows vertically through the adsorber bed 4 to entrain the moisture therefrom. At least a portion of this moisture condenses and, as liquid, rapidly and unimpededly is permitted to flow downwardly and is discharged together with the regenerating gas through the opening 3.

The system thus operated with a high degree of reliability and efficiency, allowing the two adsorber beds to be provided in a very compact configuration with the adsorber having relatively small dimensions. The adsorber occupies a minimum of space and allows, for example, four times as much adsorbent to be used for the removal of carbon dioxide as the adsorbent which is required for the removal of moisture.

Figure 4:
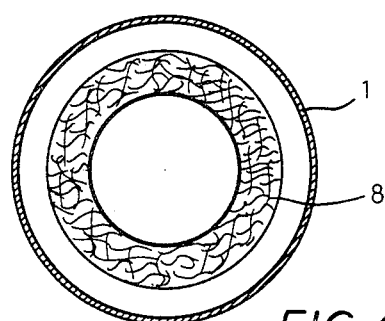
FIG. 4 is a horizontal section through this second embodiment.
Figure 3:
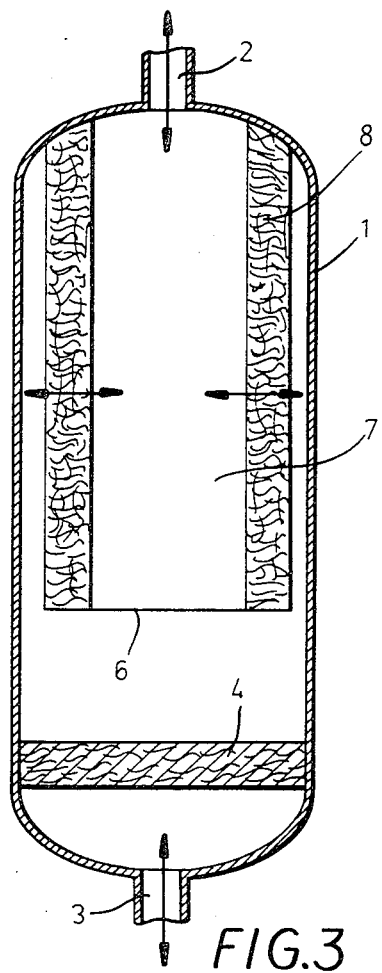
FIG. 3 is a view similar to FIG. 1 illustrating a second embodiment of the invention.

The embodiment shown in FIGS. 3 and 4 differs from that of FIGS. 1 and 2 in that the second adsorber bed 8 has a cylindrical configuration and is of an annular cross section, as will be apparent from FIG. 4. The upper end of the cylindrical bed is connected to the housing wall and the interior of the cylinder is closed at its lower end by a partition 6. The fitting 2 thus opens into the space enclosed by the cylinder. Otherwise this arrangement operates in the manner previously described in connection with FIGS. 1 and 2.

Figure 5:
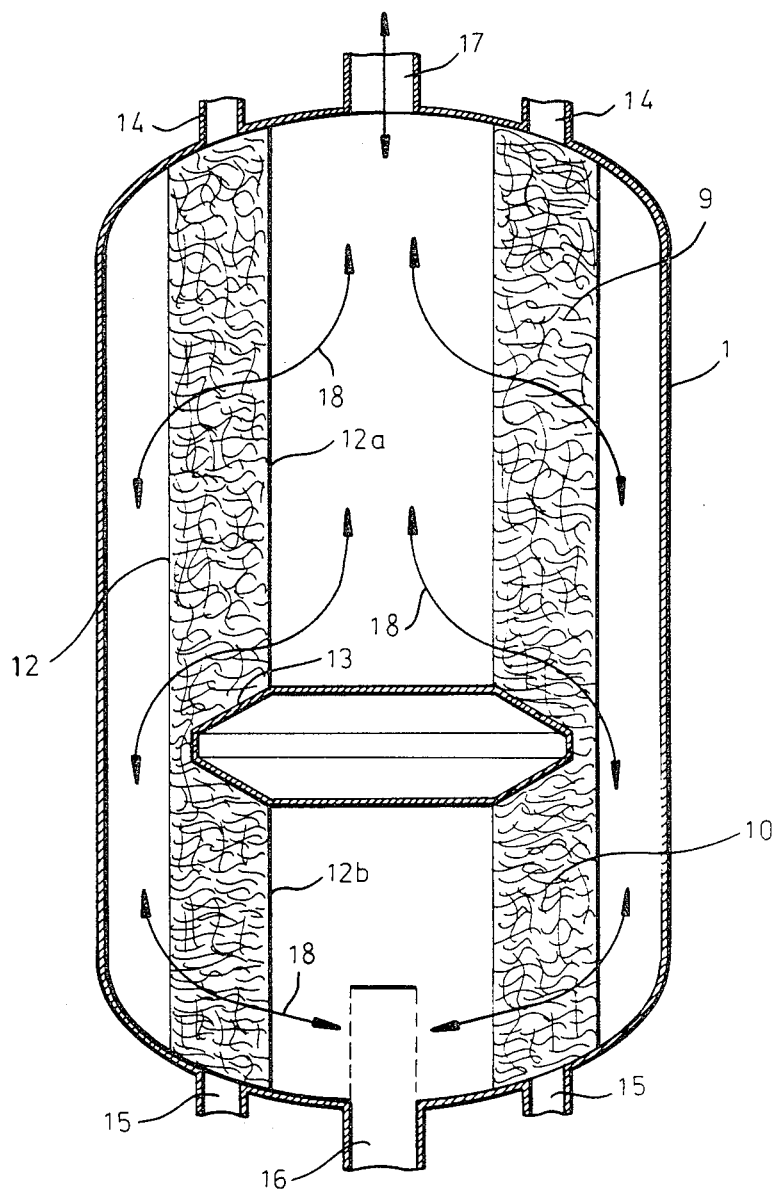
FIG. 5 is a diagrammatic axial section through still a third embodiment of an adsorber according to the invention.

FIG. 5 shows an adsorber in which both adsorber beds 9 and 10 can be upright. Here the two adsorber beds are of cylindrical configuration and annular cross section. The outer perimeter is defined by a cylindrical sieve 12 while the inner perimeter is defined by a pair of axially spaced cylindrical sides 12a and 12b, the former being provided for the upper bed 9 while the latter is provided for the lower bed 10.

Between the two sieve sections 12a and 12b a partition 13 is provided with a frustoconical configuration such that the half angle of the frustocone corresponds to the flow angle of the adsorbent in the lower bed, i.e. is about 30°. In the region of the end of this partition, a gap is provided between the partition and the sieve 12.

When the adsorbent of the lower bed is thus introduced through the hatches 14, the adsorbent flows readily via the partition through the gap to completely fill the lower bed in a gapless or fully packed manner. Once the lower bed is filled, the material for the upper adsorbent bed can be introduced. Hatches 15 have been provided for discharging the adsorbents of the two beds. The hatches can be closed with cuts as has been shown in FIG. 1.

The fittings for gas flow have been shown at 16 and 17 and the gas flow path by the arrows 18. In this embodiment the gases traverse both beds substantially horizontally.

We claim:

1. An adsorber for the selective removal of two components from a multicomponent gas stream to be treated comprising:

an upright housing;
a first adsorber bed in said housing positioned to be traversed by said gas stream to be treated;
a second absorber bed in said housing spaced from said first bed and traversed by said gas stream subsequent to its traversal of said first bed;
fittings on said housing for passing said gas station to be treated and a regenerating gas through said beds; and
means for holding at least one of said beds in an upright axial symmetrical orientation so that said gas stream and said regenerating gas traverse said one of said beds substantially horizontally, said beds being composed respectively of an adsorbent trapping a component which upon regeneration is released at least in part in a liquid form and an adsorbent trapping a component which upon regeneration is released in gaseous form, said one of said beds being said second adsorber bed and said second adsorber bed upon regeneration releasing a respective trapped component in gaseous form, said second adsorber bed being disposed above said first adsorber bed, the other of said beds being a round horizontal bed traversed vertically by said gas stream and said regenerating gas, and centered on an axis of symmetry of said one of said beds.

2. An adsorber for the selective removal of two components from a multicomponent gas stream to be treated comprising:

an upright housing;
a first adsorber bed in said housing positioned to be traversed by said gas stream to be treated;
a second adsorber bed in said housing spaced from said first bed and traversed by said gas stream subsequent to its traversal of said first bed;
fittings on said housing for passing said gas stream to be treated and a regenerating gas through said beds; and
means for holding at least one of said beds in an upright orientation so that said gas stream and said generating gas traverse said one of said beds substantially horizontally, said beds being composed respectively of an adsorbent trapping a component which upon regeneration is released at least in part in a liquid form and an adsorbent trapping a component which upon regeneration is released in gaseous form, said one of said beds being said second adsorber bed and said second adsorber bed upon regeneration releasing a respective trapped component in gaseous form, said other of said beds being an upright bed traversed horizontally by said gas stream and said generating gas, both of said beds being cylindrical of annular cross section and axially aligned with one another along a common axis, said beds being separated by a partition, said partition being frustoconical and having a half angle corresponding to the maximum flow angle of the adsorbent of the bed therebelow, said partition defining a gap enabling flow of adsorbent from the upper bed to the lower bed.

* * * * *